(12) United States Patent
Thorsbakken et al.

(10) Patent No.: US 7,080,174 B1
(45) Date of Patent: Jul. 18, 2006

(54) SYSTEM AND METHOD FOR MANAGING INPUT/OUTPUT REQUESTS USING A FAIRNESS THROTTLE

(75) Inventors: Lloyd E. Thorsbakken, Blaine, MN (US); Larry L. Byers, Apple Valley, MN (US)

(73) Assignee: Unisys Corporation, Blue Bell, PA (US)

( * ) Notice: Subject to any disclaimer, the term of this patent is extended or adjusted under 35 U.S.C. 154(b) by 442 days.

(21) Appl. No.: 10/028,161

(22) Filed: Dec. 21, 2001

(51) Int. Cl.
*G06F 13/00* (2006.01)
*G06F 13/36* (2006.01)
*G06F 13/362* (2006.01)

(52) U.S. Cl. .................. 710/112; 710/107; 710/113; 710/116

(58) Field of Classification Search ............... 710/113, 710/119, 240, 241, 242, 243, 244, 116, 107, 710/108, 112, 123, 200; 711/217; 712/217
See application file for complete search history.

(56) References Cited

U.S. PATENT DOCUMENTS

| | | | | |
|---|---|---|---|---|
| 4,554,628 | A | * | 11/1985 | Bell ........................... 710/117 |
| 5,175,837 | A | * | 12/1992 | Arnold et al. ............... 711/152 |
| 5,341,491 | A | * | 8/1994 | Ramanujan ................. 711/152 |
| 6,029,217 | A | * | 2/2000 | Arimilli et al. ............. 710/107 |
| 6,055,598 | A | * | 4/2000 | Lange ......................... 710/310 |
| 6,141,715 | A | * | 10/2000 | Porterfield .................. 710/113 |
| 6,205,150 | B1 | * | 3/2001 | Ruszczyk .................... 370/412 |
| 2002/0138670 | A1 | * | 9/2002 | Johnson ......................... 710/6 |

OTHER PUBLICATIONS

Kavi et al. "Multithreaded Systems". Advances in Computers, vol. 48 (Edited by M. Zerkowitz). Academic Press. 1998. <http://www.csrl.unt.edu/~kavi/Research/paper-list.html>.*
"Borland AppServer Programmer's Guide". Version 4.5. Borland Software Corporation. May 23, 2001. <http://info.borland.com/techpubs/books/appserver/appserver45/pdf_index.html>.*
'queue' in The Free On-Line Dictionary of Computing. Online May 11, 1995. Retrieved from Internet Oct. 7, 2005. <http://foldoc.doc.ic.ac.uk/foldoc/foldoc.cgi?query=queue>.*

* cited by examiner

*Primary Examiner*—John R. Cottingham
*Assistant Examiner*—Thomas J. Cleary
(74) *Attorney, Agent, or Firm*—Charles A. Johnson; Mark T. Starr; Crawford Maunu PLLC

(57) ABSTRACT

A system and method for providing a desired degree of fairness of access to data transfer resources by a plurality of command-initiating bus agents. A bus arbiter allocates general ownership of the bus to one of a plurality of bus agents, and a fairness module imposes a desired degree of fairness to the data transfer resources by mandating data transfer resource access to bus agents whose commands have been subjected to a retry response. The degree of fairness is controllable, in order to appropriately balance the desired throughput and data transfer resource allocation for a particular application.

32 Claims, 9 Drawing Sheets

SYSTEM AND METHOD FOR MANAGING INPUT/OUTPUT REQUESTS USING A FAIRNESS THROTTLE

FIELD OF THE INVENTION

This invention relates generally to input/output (I/O) processing systems, and more particularly to a system and method for providing a desired degree of fairness of access to data transfer resources by a plurality of command-initiating bus agents.

BACKGROUND OF THE INVENTION

In computing systems employing bus agents such as adapter cards or other peripheral devices, the bus agents may issue commands to the computing system to perform operations such as read and write operations. In carrying out these operations, the computing system may utilize a bus bridge to interface the peripheral bus (e.g., Peripheral Component Interconnect or "PCI" bus) to another bus such as a memory bus. The bridge may serve as the master for certain data transfers, in which case the bridge issues commands. Alternatively, the bridge may be the target, such that it responds to commands issued by other elements such as bus agents.

Where the bus agents are the masters, they are responsible for acquiring ownership of the bus in order to send the commands to the bridge device. The bridge responds by facilitating the memory operation associated with the command via the memory bus. For example, the bridge may facilitate a memory read or write operation based on the bus agent's corresponding read or write command. In order to obtain ownership of the bus, bus arbitration is employed to allocate ownership of the bus to the various bus agents. An arbiter may simply allocate ownership in turn, or in accordance with some predetermined allocation pattern. When the arbiter has allocated ownership to each of the agents seeking ownership, the arbiter starts over with its allocation pattern.

Although the arbiter may successfully allocate ownership to each of the various bus agents, the bridge may not be able to accept every command that the various bus agents issue. The bridge may still be processing a particular command when another bus agent has gained ownership of the bus and has issued its command. In such a case, the new command issued by the current owner of the bus must be "retried," and a retry response occurs in order to initiate the command retry. Because the arbiter simply follows a particular ownership allocation pattern, it may be oblivious to the inability of particular bus agents to gain access to the data transfer resources required to process their respective commands. This may result in a distinct lack of fairness in the manner that bus agents have their commands processed.

For example, while a current bus owner utilizes the bus, the arbiter prioritizes the next bus owner and issues a bus grant. When this next bus agent is granted ownership of the bus, it may or may not actually transfer the data. Rather, the agent may be retried by the bridge if the data transfer resources (e.g., read/write threads) are already allocated to process other commands. In other words, there are cases in which the bridge logic is busy, but the arbitration logic has already sent a "grant" signal to the next agent. This will result in a retry of this next bus agent, as well as all other bus agents until the data transfer resources become available. Thus, even though a particular bus agent may be granted the bus, it may experience "data starvation" if it needs to be retried due to the bridge still processing the request from another bus agent.

Standard arbitration schemes thus do not provide for a fair allocation for bus agent data transfer. Instead, a request/grant arbiter simply awards the use of the bus in an orderly sequence among the active bus agents on the bus without considering whether the agent actually received an opportunity to transfer data. Where the target bridge cannot process the commands fast enough, some commands might get retried, but a different bus agent may ultimately obtain access to the data transfer resources before the neglected bus agent was successfully retried. Therefore, there is no way to ensure that each adapter card or other bus agent has fair access to the bus.

Accordingly, it would be desirable to provide for fair access to the data transfer resources, irrespective of the predetermined arbitration scheme employed. The present invention provides a solution to these and other problems of the prior art, and offers additional advantages over prior art arbitration methodologies.

SUMMARY OF THE INVENTION

The present invention relates to a system and method for providing a desired degree of fairness of access to data transfer resources by a plurality of command-initiating bus agents. A bus arbiter allocates general ownership of the bus to one of a plurality of bus agents, and a fairness module imposes a desired degree of fairness to the data transfer resources by mandating data transfer resource access to bus agents whose commands have been subjected to a retry response. The present invention allows this fairness to be controlled, in order to appropriately balance the desired throughput and data transfer resource allocation for a particular application.

In accordance with one embodiment of the invention, a method is provided for managing the processing of commands issued on a bus via a plurality of bus agents. Ownership of the bus is allocated to the bus agents based on a predetermined bus arbitration order. Agent identifiers of the agents that issued retried commands, due to unavailable processing resources, are queued. Command processing priority of the processing resources is granted to the agents corresponding to the queued agent identifiers, relative to other agents having ownership of the bus in accordance with the predetermined bus arbitration order.

In accordance with more particular embodiments of the invention, the command processing priority may be regulated between the agents corresponding to the queued agent identifiers and the other agents having ownership of the bus. For example, the command processing priority may selectively grant the processing resources to agents corresponding to the queued agent identifiers relative to the other agents having ownership of the bus.

In accordance with another embodiment of the invention, a method is provided for managing the processing of commands issued on a bus via a plurality of agents. The method includes allocating bus ownership to the plurality of agents based on a predetermined bus arbitration cycle. It is determined whether processing resources are available to process the commands issued by the agents that have been granted bus ownership. A retry is initiated for the commands that were not processed due to unavailable processing resources. Agent identifiers corresponding to each of the agents in which a retry was initiated are queued. The predetermined bus arbitration cycle may be overridden, and processing of the commands may thereby be associated with the agent identifiers that have been queued.

In accordance with more particular embodiments of the invention, the method includes adjusting a ratio in which the commands issued according to the predetermined bus arbitration cycle and the commands associated with the queued agent identifiers will be processed. This may include selectively processing the commands issued according to the predetermined bus arbitration cycle and the commands associated with the queued agent identifiers in accordance with a configurable fairness parameter.

In accordance with another embodiment of the invention, a method is provided for managing the processing of commands issued on a bus via a plurality of agents. The method includes allocating ownership of the bus to the plurality of agents based on a predetermined bus arbitration order, and queuing agent identifiers identifying the agents that issued commands which were retried due to unavailable processing resources. The method further includes granting command processing priority of the processing resources to agents corresponding to the queued agent identifiers relative to other agents having ownership of the bus in accordance with the predetermined bus arbitration order. The method further includes controlling a frequency in which the command processing is granted priority to the agents corresponding to the queued agent identifiers relative to the other agents having ownership of the bus.

In more particular embodiments of the invention, controlling this frequency includes regulating the frequency at which the queued agent identifiers are granted command processing priority. In one embodiment, this involves enabling the queued agent identifiers to be output from a queue for processing after a predetermined number of valid queued agent identifiers have been passed over for processing. Enabling the queued agent identifiers to be output from a queue for processing includes comparing a predetermined pass over count to a current pass over count, incrementing the current pass over count each time a valid queued agent identifier has been passed over for processing, and enabling the queued agent identifiers to be output from the queue when the current pass over count reaches the predetermined pass over count.

In accordance with another embodiment of the invention, a cooperative arbitration and processing resource allocation system is provided. The system includes an established-order arbiter for allocating bus ownership among a plurality of bus agents. The system further includes a processing fairness module, which includes a queue to store bus agent identifiers (IDs) corresponding to bus agents that issued commands which were subjected to a retry due to unavailable processing resources. The processing fairness module further includes a queue output throttle to adjust an availability of a valid bus agent ID at an output of the queue. An override module grants command processing priority of the processing resources to either the bus agents corresponding to valid bus agent IDs or to the bus agents that have been granted bus ownership, depending on whether the valid bus agent ID at the output of the queue is available as determined by the queue output throttle.

In accordance with more particular embodiments of such a system, the queue output throttle includes a maximum starvation register, a current starvation register, and a compare module. The maximum starvation register stores a predetermined number of valid bus agent IDs that will be passed over for processing. The current starvation register stores a current number of valid bus agent IDs that have been passed over for processing. The compare module compares the current and predetermined numbers of valid bus agent IDs that have been passed over for processing, and outputs an availability indicator to indicate the availability of the valid bus agent ID.

In accordance with yet another embodiment of the invention, a system for allocating command processing resources is provided. The system includes a plurality of bus agents each capable of issuing commands, and an I/O bus coupled to each of the bus agents to facilitate transfer of the commands. A memory bus is provided to facilitate transfer of the commands to and from a memory. The system includes an I/O bridge module to interface the I/O bus and the memory bus. The I/O bridge module includes an established-order arbiter for allocating bus ownership among a plurality of bus agents. The system further includes a processing fairness module, which includes a queue to store bus agent identifiers (IDs) corresponding to bus agents that issued commands which were subjected to a retry due to unavailable processing resources. The processing fairness module further includes a queue output throttle to adjust an availability of a valid bus agent ID at an output of the queue. An override module grants command processing priority of the processing resources to either the bus agents corresponding to valid bus agent IDs or to the bus agents that have been granted bus ownership, depending on whether the valid bus agent ID at the output of the queue is available as determined by the queue output throttle.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention relates to a system and method for providing a desired degree of fairness of access to data transfer resources by a plurality of command-initiating bus agents. A bus arbiter allocates general ownership of the bus to one of a plurality of bus agents, and a fairness module imposes a desired degree of fairness to the data transfer resources by mandating data transfer resource access to bus agents whose commands have been subjected to a retry response. The present invention allows this fairness to be controlled, in order to appropriately balance the desired throughput and data transfer resource allocation for a particular application.

The present invention may be used in connection with a processor or multiple processors in a computing environment having a memory, including a single processor system having a single instruction stream, a multi-tasking system, a multi-processing system having multiple processors, a pipelined processing system where instructions are executed in instruction segments along an instruction pipeline, and the like. While the present invention is particularly advantageous in the context of multiprocessing computer systems, the present invention is not limited thereto and is equally applicable in other computing environments requiring input/output arbitration fairness. The present invention is thus not limited to the particular computing environments and embodiments described in the following figures, as will be readily appreciated by those skilled in the art from the description provided herein.

Figure 1:
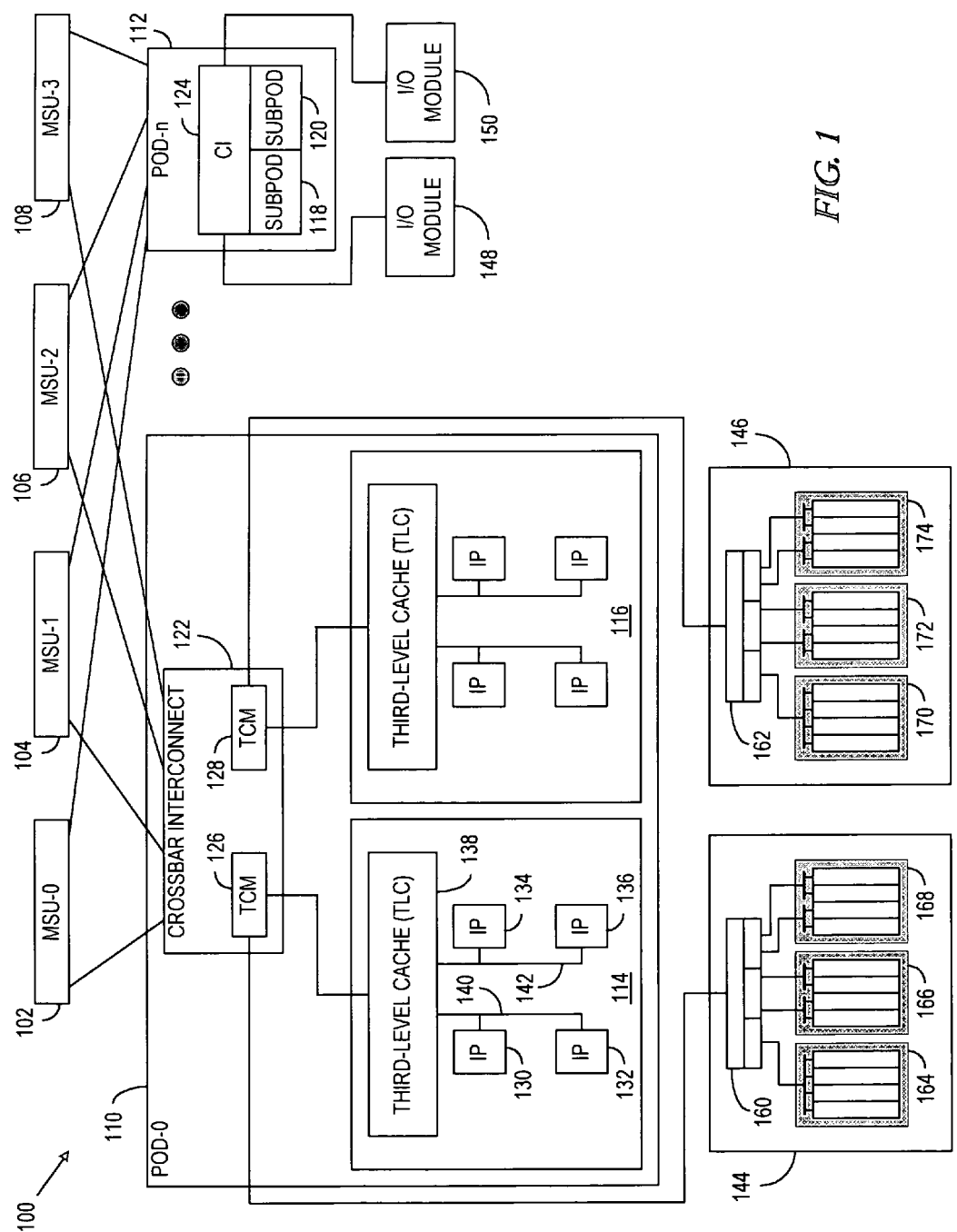
FIG. 1 is a block diagram of a computing system in which the principles of the present invention may be applied.

FIG. 1 is a block diagram of a computing system 100 in which the principles of the present invention may be applied. System 100 includes a main storage module, illustrated as a plurality of Memory Storage Units (MSUs) labeled MSU-0 102, MSU-1 104, MSU-2 106 and MSU-3 108. The collective MSU represents the main memory, such as random access memory, for the computing system 100. This memory may be accessible to multiple processing modules (PODs), such as POD-0 110 through POD-n 112. Each of the PODs 110–112 may include one or more subpods, such as subpods 114 and 116 associated with POD-0 110, and subpods 118, 120 associated with POD-n 112. The memory 102–108 is accessible to the subpods via one or more third level cache memory interfaces, shown as the Crossbar Interconnects (CI) 122–124. Each of the subpods are interconnected through dedicated point-to-point Interfaces to a crossbar module (TCM) within the crossbar interconnect, such as crossbar modules 126 and 128 associated with crossbar interconnect 122.

Each subpod includes one or more processing modules (i.e., instruction processors; IP), such as modules 130, 132, 134, 136 associated with subpod 114, each of which may include its own first level cache (FLC) and second level cache (SLC), and may in turn be coupled to a third level cache (TLC) 138 via one or more buses 140, 142. The IPs 130–136 perform various processing operations required by the computing system 100. Other subpods, such as subpod 116, 118, 120, include analogous circuitry in this particular embodiment.

The computing system 100 further includes multiple input/output (I/O) modules, such as I/O modules 144, 146, 148, and 150. These I/O modules provide an interface between various I/O devices and the subpods. The crossbar interconnect circuits, e.g., CI 122 through CI 124, collectively serve as a crossbar module to selectively transfer data between the MSUs 102, 104, 106, 108, and the I/O modules 144, 146, 148, 150 and corresponding subpods. These I/O modules 144, 146, 148, 150 interface with the processing modules via a memory input/output (MIO) bus in one embodiment of the invention.

In accordance with the present invention, one or more of the I/O modules 144, 146, 148, 150 includes a bridge module, such as bridge modules 160, 162, to interface peripheral devices to the processing modules and/or memory modules. In one embodiment of the invention, the bridge modules 160, 162 communicate with the processing modules via an MIO bus, and communicate with one or more peripheral devices via peripheral component interconnect (PCI) buses. More particularly, bridge module 160 is a PCI bridge in accordance with one embodiment of the invention, although the invention is applicable to other bussing architectures used to communicate with peripheral devices. The peripheral devices may be housed in card slots in one or more peripheral device housings, such as housings 164, 166, 168 in I/O module 144, and housings 170, 172, 174 in I/O module 146. The I/O modules will be described in greater detail in connection with FIG. 2.

Figure 2:
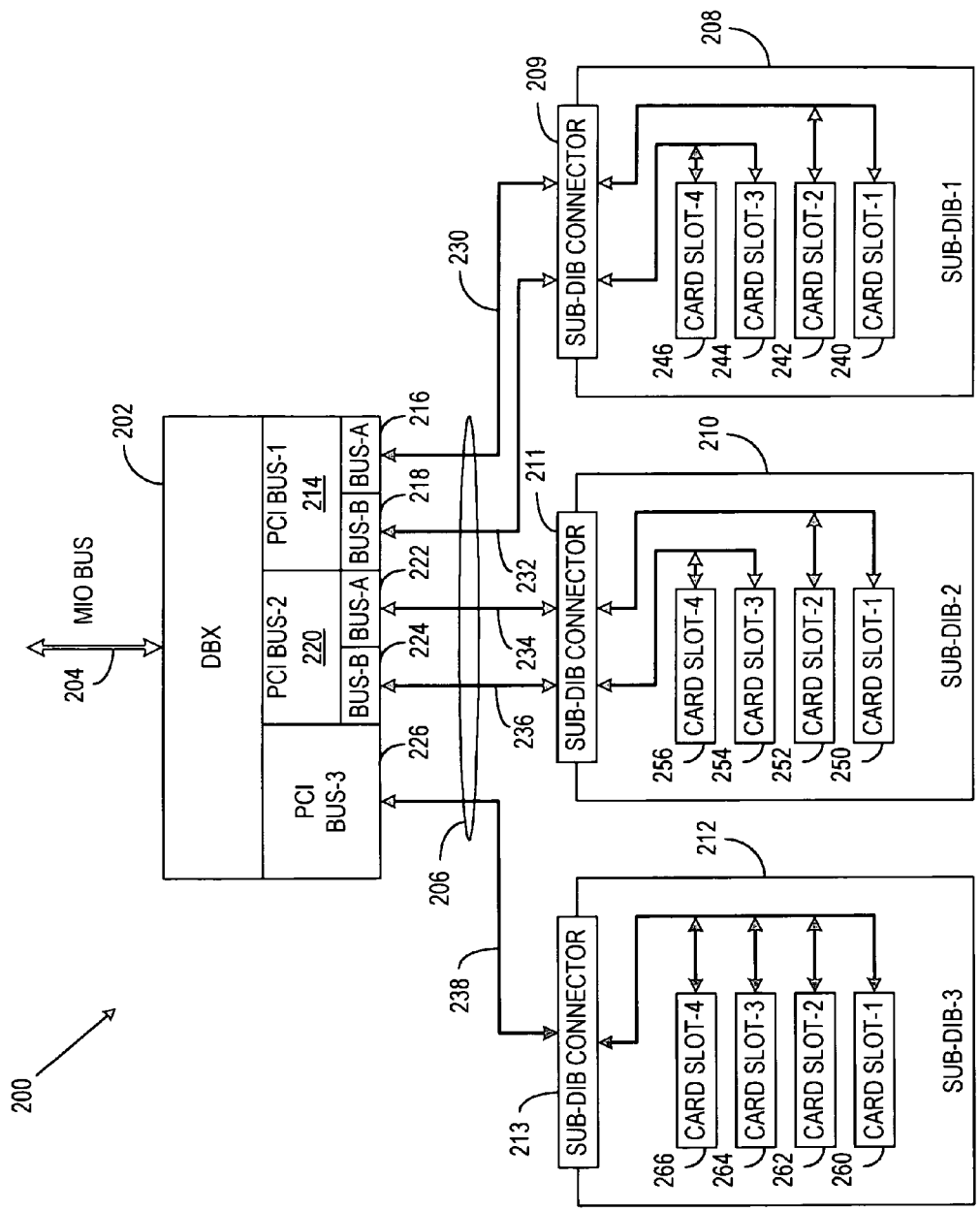
FIG. 2 is a block diagram of an exemplary input/output (I/O) environment in which the principles of the present invention are applicable.

Referring now to FIG. 2, a block diagram is provided of an exemplary I/O module 200. The I/O module 200 provides a representative example of an input/output environment in which the principles of the present invention are applicable, although the invention is equally applicable to other arrangements.

The I/O module 200 includes a PCI bridge module 202, referred to as the Direct I/O Bridge extended (DBX) module. The I/O module 200 communicates with processing modules and/or memory modules via the MIO bus 204, and communicates with various peripheral devices via PCI buses 206. In this embodiment, the peripheral devices are provided in what are referred to as Sub Direct I/O Bridge (SubDIB) modules, such as SubDIB-1 208, SubDIB-2 210, and SubDIB-3 212. Each of the SubDIBs 208, 210, 212 includes a SubDIB connector 209, 211, 213 respectively, which facilitates connection of the SubDIB modules to the DBX module 202. One or more SubDIB modules may be used in connection with the present invention, and the example of FIG. 2 illustrates three SubDIB modules for purposes of illustration only.

In accordance with one embodiment of the invention, each SubDIB 208, 210, 212 is associated with one "logical" PCI bus, although one or more physical PCI buses may be used to create any one logical PCI bus. For example, the DBX module 202 includes PCI Bus-1 214, which includes two physical PCI bus components. These two physical PCI bus components include BUS-A 216 and BUS-B 218. Similarly, the PCI BUS-2 220 includes BUS-A 222 and BUS-B 224. PCI bus-3 226 includes only one physical PCI bus.

Each of the PCI buses is coupled to a SubDIB connector. PCI BUS-1 214 is coupled to SubDIB connector 209 via two physical PCI buses 230, 232 via the BUS-A 216 and BUS-B 218 ports. PCI BUS-2 220 is coupled to SubDIB connector 211 via two physical PCI buses 234, 236 via the BUS-A 222 and BUS-B 224 ports. PCI BUS-3 226 is coupled to SubDIB connector 213 via PCI bus 238. In one embodiment, each PCI bus appears to the software as an independent bridge with its own configuration space, and runs independent of the other PCI buses. As indicated above, the particular number of SubDIBs and buses coupling the DBX module 202 may be any desired number.

Within each SubDIB, one or more card slots are provided for receiving adapter cards, such as PCI add-in cards (e.g., peripheral devices). For example, SubDIB-1 208 includes four card slots (CS), including CS-1 240, CS-2 242, CS-3 244, and CS-4 246. SubDIB-2 210 includes four card slots, including CS-1 250, CS-2 252, CS-3 254, and CS-4 256. Finally, SubDIB-2 212 includes four card slots, including CS-1 260, CS-2 262, CS-3 264, and CS-4 266. In an exemplary embodiment of the invention, at least one of the SubDIB modules provided in the system includes a plurality of card slots and associated adapter cards. The adapter cards may represent any type of peripheral device, and these peripheral devices may make data read and/or data write requests to the processing and/or memory modules in the system. The peripheral devices may also receive data read and/or write requests, depending on the type of peripheral device.

The present invention is applicable to a variety of bussing schemes and peripheral read/write request methodologies. For example, various bussing architectures may be used, such as PCI, as well as various numbers of physical and logical buses. Various numbers of peripheral devices (hereinafter referred to as adapter cards or agents) may make read/write requests, and different numbers of adapter card housing modules may be employed for each of a plurality of buses. Further, the bussing scheme may be configured such that the bus bridge supports multiple "threads," such as two read threads and one write thread. These and other design factors may result in various situations where bus requests cannot all be handled concurrently without delay or the issuance of command "retries." In order to facilitate an understanding of the invention, a particular exemplary bussing design is described below that illustrates the need and benefits of the bus request fairness scheme of the present invention. From the description provided below, those of ordinary skill in the art will readily appreciate that the present invention is equally applicable to other bussing schemes. The exemplary embodiment below describes a particular I/O read/write command scenario that exhibits characteristics that will clearly benefit from the principles of the present invention. Therefore, the exemplary input/output computing environment described below is representative of various input/output arrangements that may implement and benefit from the present invention, however the invention is not limited thereto.

A representative I/O read/write command scenario assumes a PCI bussing architecture where the adapter cards are "masters," and are responsible for acquiring ownership of the bus in order to dispatch commands to the bridge. The bridge in turn manages the requests and carries out data transfers to and from memory. In this representative example, it is assumed that a predetermined number of adapter cards associated with a particular PCI bus can obtain ownership of the bus at any given time. For example, it is assumed that only one adapter card can obtain ownership of a particular PCI bus at any time.

However, in many bussing arrangements, a bridging module cannot accept every command that the adapter cards send, even though the adapter cards were granted ownership of the bus. For example, the PCI bridge may receive a read or write command from a first adapter card via a PCI bus, and process that command. However, it will take some time for the bridge module to accept another command on that PCI bus as it processes the command from the first adapter card. Assume an arbitration methodology was configured to grant ownership to each of a predetermined number (e.g., four) adapter cards in a sequential manner. For example, the first adapter card would be granted ownership, then the second, then the third, and so forth. When the first adapter card has sent its command, then the second adapter card will get ownership of the bus and will send its command. The bridge may not, however, be done processing the command from the first adapter card. In the PCI bussing context, the bridge will therefore issue a "retry" response to the second adapter card. Meanwhile, the third adapter card will have gained ownership of the bus, and sent its command. By this time, the bridge may be ready to process another command, and will accept the command from the third adapter card. As can be seen from this example, the second adapter card's request has essentially lost its turn, and must therefore try again in response to the retry response. However, the same situation can repeatedly affect the second adapter card, essentially blocking out the second adapter card from having any (or an undesirable low number of) read/write commands processed for a period of time.

A representative I/O system exhibiting such characteristics in which the principles of the present invention may be applied is described here for purposes of illustration. In this exemplary embodiment, each PCI interface includes a read buffer that is optimized for no initial wait states and no wait states during burst operations. PCI read requests are immediately retried by the respective PCI interface, rather than waiting some number of cycles (e.g., 32 PCI cycles). Each of two read threads (0 and 1) in the PCI interface is allocated a read buffer, which is divided into a number of system word blocks or cache lines. When an adapter card (i.e., PCI agent) makes a PCI read request, the PCI interface immediately retries the agent and assigns a read thread (0 or 1) if one is available. If a read thread is not available, the DBX will continue to retry the agent until a read thread becomes available. If a read thread is available, the DBX makes one, or a multiple number such as eight, PCI read requests to the MIO bus request queue depending on the bus command. For example, the bus command may be a memory read or memory read cache line, each of which result in one read request to the MIO bus request queue. Alternatively, the bus command may be a memory multiple read where a predetermined number, such as eight, read requests are made to the MIO bus request queue.

When the PCI interface logic assigns a read thread and issues a retry response to the master, it latches the PCI address and the PCI command, and immediately makes a PCI read request(s) to the MIO bus request queue. The agent then retries the request with the same PCI address and PCI command. When the agent retries the request and the data is available (i.e., retrieved from memory/storage), the PCI interface transfers the data. When the PCI agent makes a read multiple request and a read thread is available, eight cache lines are generated to memory. In order for the PCI interface logic to make these eight requests, all eight blocks (i.e., cache lines) should be available in the read buffer. When the last word of the last block of data is transferred to the PCI bus, the PCI interface logic disconnects, thereby terminating the transaction.

As stated above for this exemplary read/write environment, the PCI interface logic, as a target, has the capability to have two command threads (e.g., a PCI read and a PCI write command, or two PCI read commands) concurrently active within any interval of time. When two command threads are active, the target PCI interface logic will retry all PCI requests until one of the threads becomes available. More particularly, in this exemplary read/write environment, a certain maximum number of commands may be active at any given time, such as two active commands. The PCI interface logic may not accept a new read command and will issue a retry response where, for example, both read threads are active, a read thread is already active and a write thread has one or more cache lines in the write buffer that are still valid and not yet sent on the MIO bus, etc. Analogously, the PCI interface logic may not accept a new write command and will issue a retry where, for example, both read threads are active, a read thread is already active and a write thread has one or more cache lines in the write buffer that are still valid and not yet sent on the MIO bus, etc.

The above-described I/O read/write environment sets forth examples of criteria that may affect the ability of the DBX to process requests in turn. As described above, traditional arbiter schemes may simply grant bus ownership to the various PCI agents in a predetermined order, such as a simple rotational priority. However, where certain criteria is not met as described above, the PCI agent's request may not be processed immediately by the DBX, but rather may be subjected to a retry. This can cause certain agent/adapter cards to essentially lose their turn, and in some cases can significantly affect the fairness of the adapter card processing.

Figure 3:
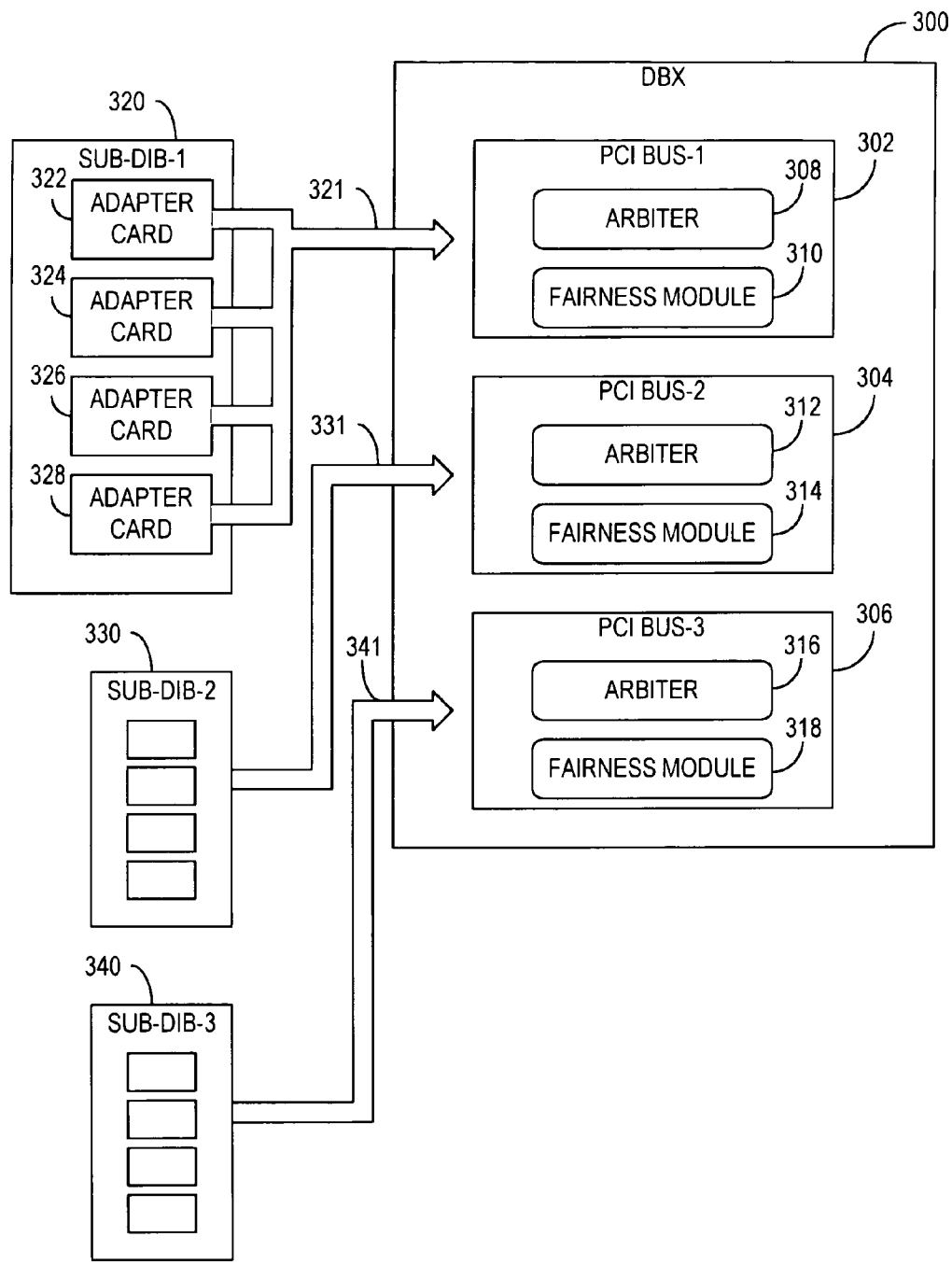
FIG. 3 is a block diagram illustrating an exemplary embodiment of the invention where a cooperative arbitration and resource allocation scheme is employed.

In one embodiment of the present invention, a cooperative arbitration and resource allocation scheme is implemented which addresses the processing fairness issue as it applies to the various adapter cards associated with a particular PCI bus (or other bussing technology). FIG. 3 is a block diagram illustrating an exemplary embodiment of the invention where a cooperative arbitration and resource allocation scheme is employed for command processing. The DBX module 300 includes one or more PCI buses, which in the illustrated embodiment includes PCI Bus-1 302, PCI Bus-2 304, and PCI Bus-3 306. These correspond to the PCI buses 214, 220, and 226 described in connection with FIG. 2. Each PCI bus facilitates communication with various peripheral devices in various adapter card systems, referred to previously as the SubDIB modules. For example, the PCI buses 302, 304, and 306 communicate with SubDIB-1 320, SubDIB-2 330, and SubDIB-3 340 respectively. Each SubDIB includes one or more card slots to house one or more adapter cards, such as adapter cards 322, 324, 326, 328 associated with SubDIB-1 320. Any number of SubDIB modules and corresponding buses may be used in connection with the present invention, and the example of FIG. 3 illustrates three SubDIB modules and three PCI buses for purposes of illustration only.

In the arbitration/fairness scheme of FIG. 3, each PCI bus 302, 304, 306 includes an arbiter, and a fairness module. For example, PCI Bus-1 302 includes arbiter 308 and fairness module 310, PCI Bus-2 304 includes arbiter 312 and fairness module 314, and PCI Bus-3 306 includes arbiter 316 and fairness module 318.

For each of the PCI buses, the arbiter 308, 313, 316 manages ownership of its respective PCI bus. For example, the arbiter 308 manages ownership of logical PCI bus 321, which may include one or more physical PCI buses as described in connection with FIG. 2. Similarly, the arbiters 312 and 316 manage ownership of logical PCI buses 331 and 341 respectively. These arbiters form the first aspect of the cooperative arbitration and resource allocation scheme. In one embodiment of the invention, each arbiter is configured to grant ownership of the bus to each of its associated adapter cards in accordance with a predetermined arbitration scheme. More particularly, the arbiters each determine which of the adapter cards will be granted ownership of the bus "next." This may be accomplished where the arbiters implement, for example, a rotational priority scheme. The arbiters pass out ownership in a predetermined order, such that each adapter card is granted ownership in turn. When an arbiter has passed out ownership to each of the adapter cards, it starts over and again grants ownership according to the order or algorithm established in advance.

More particularly, while a current bus owner utilizes the bus, the respective arbiter 308, 312, 316 prioritizes the next bus owner and issues a grant signal. Using PCI bus 321 as an example, if adapter card 322 currently owns the bus 321, the arbiter 308 prioritizes the next bus owner, e.g., adapter card 324, and issues a grant signal. When adapter card 324 is granted ownership of the PCI bus 321, it may or may not actually transfer the data. The agent may be retried by the DBX 300 if the data transfer resources (e.g., read/write threads) of its respective PCI interface are already allocated. In other words, there are cases in which the PCI logic is busy, but the arbitration logic (i.e., arbiter) has already sent a "grant" signal to the next agent. This will result in a retry of the next adapter card requester, and all other adapter card requesters until the data transfer resources become available. Thus, even though the adapter card 324 may be granted the PCI bus 321, it may experience "data starvation" if it needs to be retried due to the DBX 300 still processing the request from the first adapter card 322.

The present invention addresses this problem by providing an additional resource allocation aspect beyond the granting of access to the bus. This is provided by the fairness modules 310, 314, 318. Each PCI bus interface 302, 304, 306 includes its own fairness module 310, 314, 318 in one embodiment of the invention. The fairness modules address the potential data starvation problem and ensure an appropriate allocation of the data transfer resources (e.g., read/write threads) in the PCI interface logic. In one embodiment of the invention, the fairness modules override the predetermined order in which their respective arbiter grants ownership to the various PCI agents.

Figure 4:
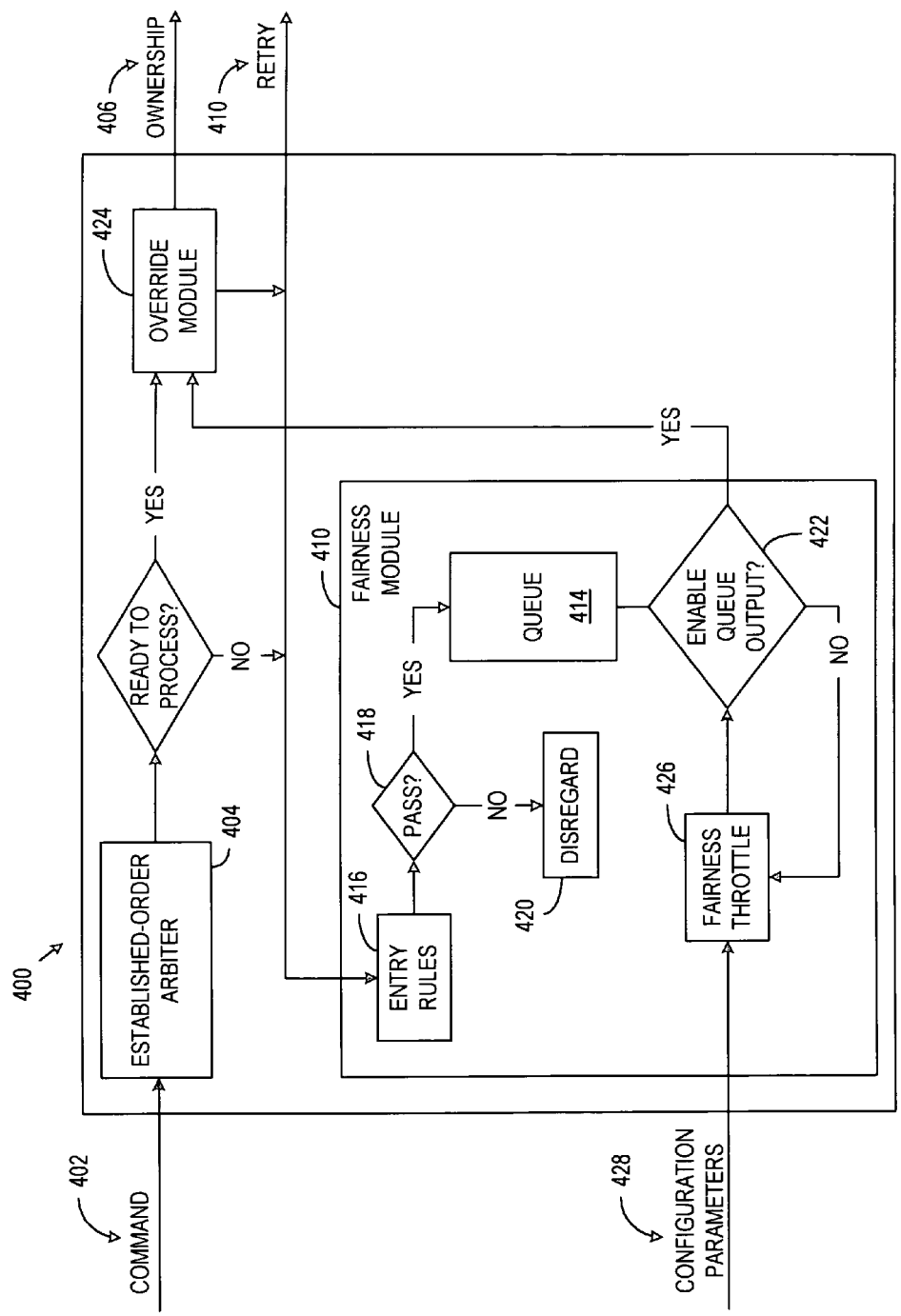
FIG. 4 illustrates an exemplary embodiment of a cooperative arbitration and resource allocation logic module in accordance with the principles of the present invention.

FIG. 4 illustrates an exemplary embodiment of a cooperative arbitration and resource allocation logic module 400 in accordance with the principles of the present invention. The arbitration logic module 400 corresponds to each of the PCI bus modules 302, 304, 306 generally described in connection with FIG. 3. The logic module 400 illustrates various primary functions associated with a cooperative bus arbitration and resource allocation system for fairly allocating PCI bus ownership and resource allocation in accordance with the invention.

When one of a plurality of PCI agents (adapter cards) associated with a bus wants to request ownership of the bus, it issues a command 402 to the arbitration module 400. For example, this command may be a one of a plurality of various types of read or write commands which request that data be read from or written to the system cache and/or main memory. It should be noted that multiple agents may issue commands to the arbitration logic in the DBX bridge at a given time, therefore requiring the arbitration logic 400 to allocate bus ownership rights in an orderly, and fair manner.

Ownership rights are first determined in connection with an established-order arbiter 404. The arbiter 404 corresponds to the arbiters 308, 312, 316 illustrated in connection with FIG. 3. The established-order arbiter is configured to grant bus ownership to the various requesting agents in a predefined, established order. This order may be fixed, or may be set according to a predefined algorithm. In accordance with one embodiment of the invention, the arbiter 402 utilizes a rotational or modified rotational priority. A default ownership order is therefore provided by the arbiter 404, and ownership is granted to a particular adapter card as shown by the ownership grant signal 406. The ownership signal 406 corresponds to a particular grant signal for the adapter card whose turn arose in connection with the established-order arbiter 404.

As set forth above, the PCI bridge, the DBX module in this embodiment, may not have completed processing a particular request when a subsequent adapter card has been granted ownership of the bus. This is depicted by the functional decision block 408. In the case where the DBX is not ready to process the new request, the DBX may issue a retry response 410 to the requesting adapter card. However, this may ultimately result in unfairness in processing allocation to the requesting adapter card, particularly where further retries occur. The fairness module 412 serves to impose fairness to the PCI agent processing allocation.

When a command cannot be immediately processed by the DBX as described above, that command may be retried by issuing a retry 410 response on the bus. Further, the fairness module 412 serves to queue those requests that were not able to be accepted and processed. Thus, adapter card identifiers (agent ID) for read/write commands 402 that were subject to a retry 410 will be passed to the fairness module queue 414, where agent IDs from each of the adapter cards associated with the particular PCI bus may be queued. In one embodiment of the invention, the queue 414 is a first-in, first-out (FIFO).

In accordance with one embodiment of the invention, the queue 414 stores an agent ID associated with each adapter card that has been subjected to a retry. For example, in the case where four adapter cards A, B, C, and D vie for the PCI bus, the queue will store an agent ID for any of the adapter cards A, B, C, D which were retried due to the DBX's inability to immediately accept and process a corresponding request. Therefore, if it is determined 408 that an agent request is not ready to be processed by the DBX, a retry 410 is issued for that request, and the agent ID is placed on the queue 414.

In one embodiment of the invention, the agent ID may not always be placed on the queue 414 as soon as it is determined that the respective agent ID's request required a retry. In this embodiment, entry of the agent ID onto the queue 414 is subject to entry rules 416. These entry rules can be defined as desired. In one embodiment of the invention, a plurality of entry rules determine whether the agent ID will be entered onto the queue 414. For example, the entry rules may include a requirement that the PCI interface is not already processing a data transfer for that particular agent. Another example is that the agent ID seeking to be entered onto the queue 414 is not already in the queue 414. As described above, a threshold requirement to enter the queue in accordance with one embodiment of the invention is that the request from a particular agent be subject to a retry. In other words, if the data transfer resources were available for the DBX to accept and process the request, then the request need not be, and is not, entered onto the queue 414. Other or different entry rules 416 may be implemented in accordance with the invention.

If it is determined that there is compliance with the entry rules as determined at functional decision block 418, the agent ID for that adapter card request will be entered on the queue 414. Otherwise, the request is disregarded 420. In this embodiment, there may be up to one agent ID in the queue for each of the adapter cards vying for ownership of the bus and allocation of the data transfer resources.

As will be described more fully below, the present invention includes a manner of adjusting the "fairness" in which each of the adapter card requests will be allocated ownership of the bus. Assuming first that a "total fairness" is desired, any agent ID on the queue 414 would receive top priority to the bus when the PCI interface becomes available. In this instance, the functional decision block 422 determines that the queue 414 output will be enabled as soon as the queue 414 contains even a single agent ID entry. Thus, in a total fairness scenario, any time the queue has an entry, the queue output will be enabled so that the next agent available in the queue 414 will be accepted and processed. This will occur even though other commands 402 may be requesting ownership of the bus. This is accomplished by the overriding module 424, which will allow the queued agent ID to override any default ownership grant by the arbiter 404. In this instance, when the PCI interface becomes available, the ownership grant 406 will correspond to the requesting agent whose agent ID was taken from the queue 414. The ownership grant(s) suggested by the arbiter 404 that are "bumped" due to the override function of the fairness module 412 will then be retried 410. In a total fairness scenario, the ownership will be thus dictated by the fairness module queue 414 as long as entries are present in the queue 414.

In accordance with the invention, the degree to which this "fairness" is imposed on adapter card processing allocation is adjustable. As will be described more fully below, the fairness throttle 426 facilitates a sliding scale between data throughput and fairness of adapter card processing allocation. The higher data throughput rate selected via the fairness throttle 426, the less "fair" the adapter card processing allocation will ultimately be. On the other hand, where a high degree of fairness is desired and selected via the fairness throttle 426, the data throughput may be reduced. This is because the fairness module mandates that a particular adapter card request be considered when it is deemed to have priority, even though other requests may have to wait, which may reduce throughput. For example, in a total fairness scenario, any new data transaction requests from adapter cards will be forced to wait (e.g., retried) until those other requests associated with the fairness module queue 414 are handled. Alternatively, in a situation where the fairness module is set to a very low degree of fairness, the throughput will increase because the queue 414 is not given complete priority, but rather is provided some lower degree of priority. Therefore, depending on the particular application, the fairness throttle 426 allows flexibility in fairness versus throughput.

The fairness throttle 426 essentially indicates when the queue 414 output will be enabled, as shown at functional decision block 422. When the fairness throttle 426 determines that it is time to consider a queued entry, the queue 414 output is validated, which in turn causes the override module 424 to grant the queued request ownership 406 and retry any ownership allocations suggested by the arbiter 404.

Because the fairness is adjustable, the fairness throttle may be configured for the particular fairness desired. The fairness throttle 426 may be configured statically at a predetermined time, such as initialization of the DBX system or during some other DBX idle time. Alternatively, the fairness throttle 426 may be configured dynamically, such that the fairness is adjustable during normal operation of the system. In one embodiment of the invention, these static and/or dynamic adjustments may be effected by modifying a variable or other memory/register value that holds a count corresponding to the number of times that a queued value in the fairness module queue 414 will be bypassed for priority consideration. For example, a count of zero would indicate that the contents of the queue 414 will never be bypassed for priority, thereby indicating a "total fairness" scenario. On the other hand, a non-zero count value indicates that the queue 414 will be bypassed a corresponding number of times, thereby allowing other input requests to be handled first, which increases throughput. As can be seen, a higher count value decreases fairness, but increases throughput.

In accordance with one embodiment of the invention, the fairness throttle 426 is configured statically, at the time of initialization of the DBX system. Configuration parameters 428 are input to the fairness throttle 426 in order to establish the degree of fairness to be imposed on the system. The manner in which these configuration parameters set the degree of fairness is described more fully below.

Figure 5:
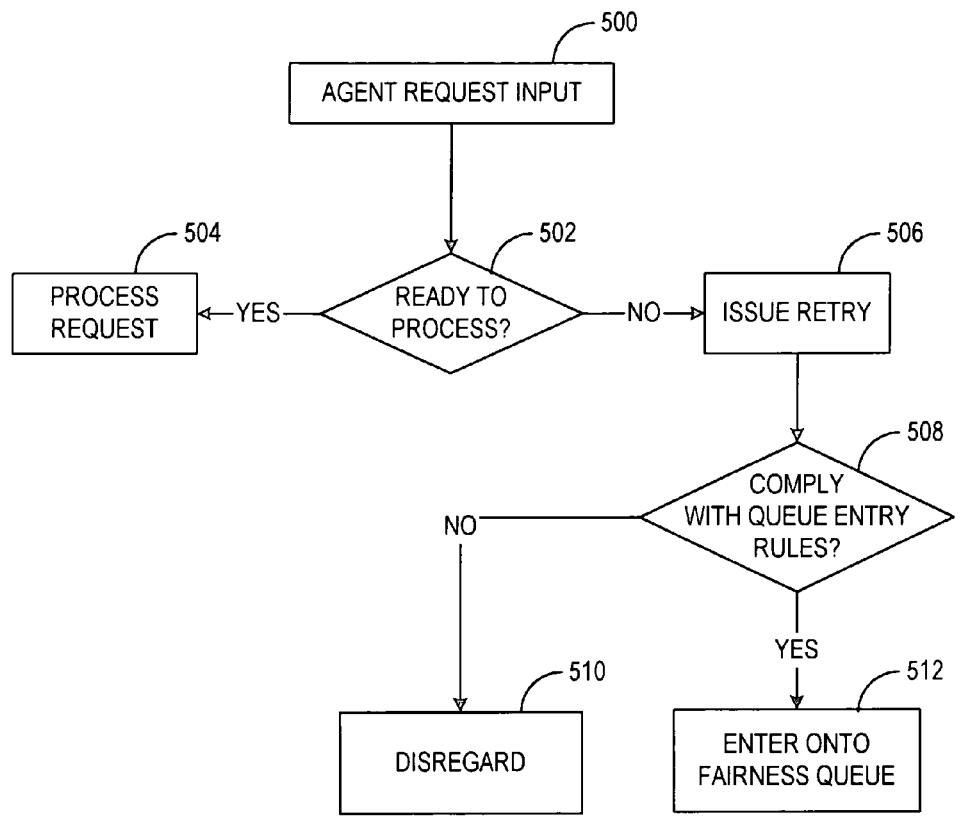
FIG. 5 is a flow diagram illustrating an exemplary manner in which the arbitration module manages agent requests in accordance with the invention.

FIG. 5 is a flow diagram illustrating an exemplary manner in which the arbitration module manages agent requests in accordance with the invention. An agent request (e.g., read/write command) is input 500 to the arbitration logic. If the DBX is ready to process the request as determined at decision block 502, the request is processed 504. If the DBX is still processing another read/write request or is otherwise busy, it is not ready to process the new agent request. In this case, a retry response may be initiated, but in any event it will be a candidate for entry on the fairness queue. This is accomplished by first determining 508 whether the particular requesting agent complies with certain predetermined entry rules, such as whether the agent already has a request being processed or is already on the fairness queue. If the request is not to be entered on the queue for failure to meet the entry rules, it is disregarded 510. Otherwise, the agent request is entered 512 onto the fairness queue.

Figure 6:
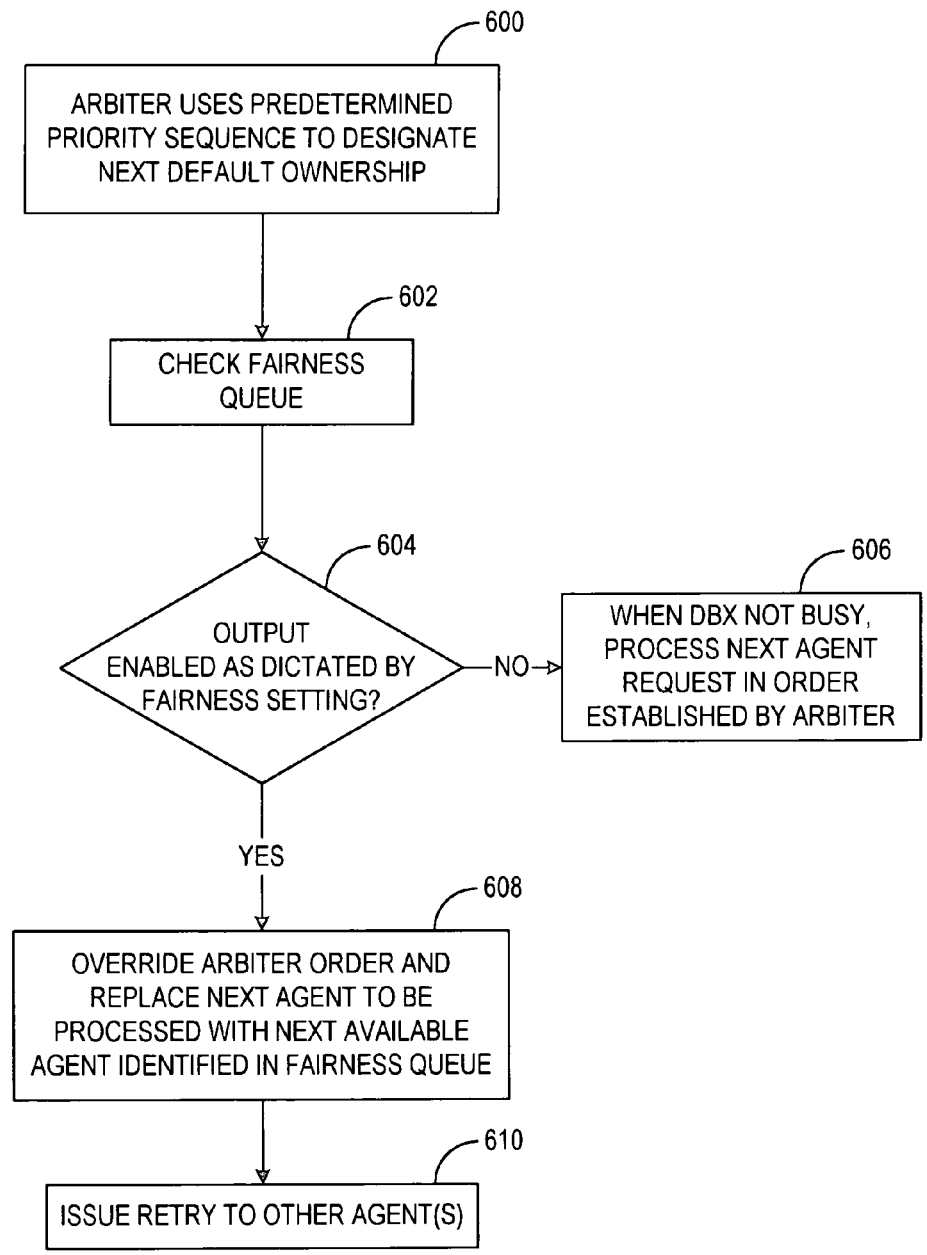
FIG. 6 is a flow diagram illustrating an exemplary utilization of a cooperative arbitration and resource allocation fairness technique in accordance with the principles of the present invention.

FIG. 6 is a flow diagram illustrating an exemplary utilization of a cooperative arbitration and resource allocation fairness technique in accordance with the principles of the present invention. FIG. 6 provides an example in which ownership is granted pursuant to the fairness methodology of the present invention. The arbiter implements a predetermined priority sequence in order to designate the next default ownership, as shown at block 600. For example, the predetermined priority sequence may be a predetermined rotational priority or some variant thereof to assign default ownership. The predetermined priority sequence may also involve an algorithmic manner of assigning default ownership.

Before the default ownership is utilized, the fairness queue is checked 602. As indicated above, a degree of fairness can be set to determine whether or not the output of the fairness queue is to be validated, thereby causing the queue entry to be the next agent to be processed. The fairness setting may be fixed, or may be adjustable such as through the use of the fairness throttle described in connection with FIG. 4. If the output is not enabled pursuant to the fairness setting as determined at decision block 604, then the next agent request is processed 606 in the order established by the arbiter, when the DBX is no longer busy. Otherwise, if the output is enabled pursuant to the fairness setting, the arbiter order is overridden, and the next agent to be processed is replaced with the next available agent identified in the fairness queue as shown at block 608. Retry responses may then be issued 610 for the other agent(s) that would have been processed had the fairness queue entry not replaced it/them.

Figure 7:
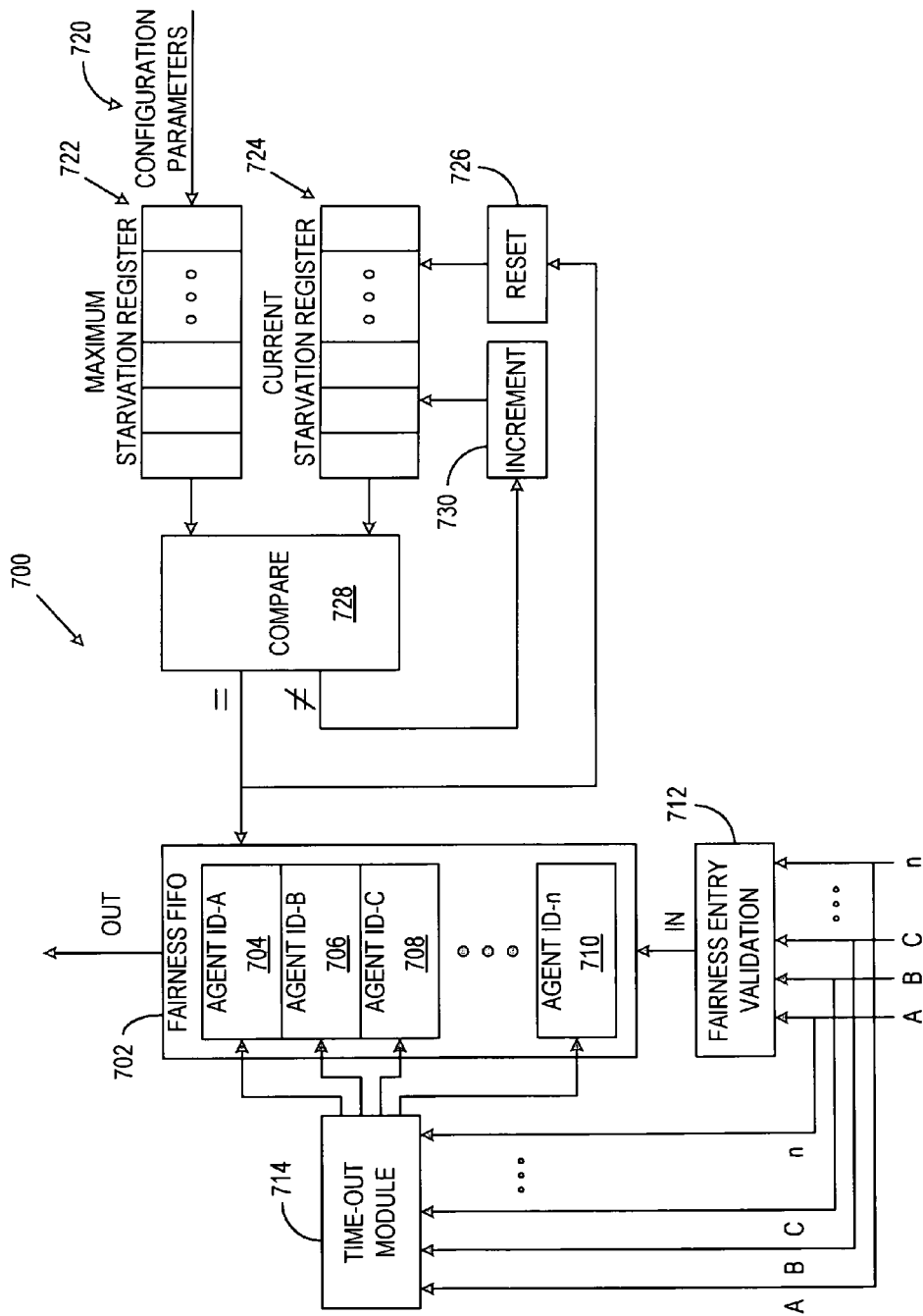
FIG. 7 is a block diagram illustrating an embodiment of an exemplary fairness module in accordance with the principles of the present invention.

FIG. 7 is a block diagram illustrating an embodiment of an exemplary fairness module in accordance with the principles of the present invention. The fairness module 700 ensures that no agent is starved of access to storage via the DBX data transfer resources (i.e., read/write threads) where the DBX bridge is the target.

In the present example, the fairness queue 702 is an n-deep FIFO, where the number of FIFO locations corresponds to the number of potential requesting agents (adapter cards or independent requesting peripheral modules). The FIFO can be larger in accordance with the invention, however in one embodiment the queue entry rules prohibit entry of an agent ID if it is already on the queue 702, so the size need be no larger than the number of potential requesting agents in such an embodiment. For purposes of illustration, the fairness FIFO 702 is shown as filled with agent IDs, including Agent ID-A 704, Agent ID-B 706, Agent ID-C 708, through Agent ID-n 710. As agents are enabled for processing by the DBX, the agent IDs move up the fairness queue 702, and enter the queue if allowed entry in accordance with the fairness entry validation module 712. The entry validation module 712 applies the entry rules previously discussed.

The fairness FIFO 702 holds the agent IDs of the agents that have presented new transactions targeted for a data transfer to or from the memory/storage that could not be immediately processed by the DBX. In one particular embodiment, for each potential agent requester A, B, C, through n, a time-out module 714 ensures that each respective agent that is next to be considered at the output of the fairness queue 702 is removed from the FIFO output if the corresponding agent does not retry the command for a predetermined number of clock cycles.

The fairness module 700 is adjustable in that the degree of fairness can be set to provide the desired balance of throughput versus fairness. In one embodiment, the degree of fairness is selected at DBX initialization time through the provision of configuration parameters 720. The configuration parameters in the illustrated embodiment correspond to an n-bit "maximum starvation value" that determines when the next valid entry at the output of the fairness FIFO 702 may be serviced by the PCI interface logic. The n-bit maximum starvation value is input into an n-bit maximum starvation value register 722 which includes register locations to store the n-bit maximum starvation value. In one embodiment of the invention, the register 722 is a four-bit register allowing for a programmable maximum starvation value between 0 and F (hexadecimal). The maximum starvation value defines the number of times the valid output of the fairness FIFO 702 may be passed over before it is serviced by the PCI interface logic.

In addition to a maximum starvation register 722, a current starvation register 724 is provided to store the current count of times that the valid output of the fairness FIFO 702 has been passed over. This register is reset to a predetermined value, such as zero, by the reset module 726. For example, the reset module 726 may be a software module having associated program instructions to cause a processing unit to clear the register 726 by writing zeros to the memory or register address of the register 724. A hardware reset mechanism may also be employed where appropriate.

When the agent ID at the top (first in line) of the fairness queue 702 represents a valid potential output, the decision as to whether the corresponding agent will be allowed to be processed depends on the relative state of the maximum and current starvation registers 722, 724. For example, if the maximum starvation value is set to "0" in the maximum starvation register 722, then zero "pass overs" will be allowed, and any agent associated with the agent ID at the top of the queue 702 will be immediately identified for command processing. If the maximum starvation value is set to "1" in the maximum starvation register 722, then one "pass over" will occur before the agent associated with the agent ID at the top of the queue 702 will be identified for command processing. As can be seen, the greater the value in the maximum starvation register, the correspondingly greater number of times the valid output of the fairness queue 702 will be skipped.

In order to track the number of times in which the particular agent at the top of the queue 702 has been skipped, the current starvation register 724 stores the current count value. For example, after it has been reset, the current starvation register 724 is incremented each time processing of the agent associated with the agent ID at the top of the queue 702 has been skipped. When the current starvation value in the current starvation register 724 equals the programmable maximum starvation value in the maximum starvation register 722, then the agent associated with the agent ID at the top of the queue 702 is given processing priority over any default condition set by the arbiter (not shown; see FIGS. 3, 4).

More particularly, the values in each of the current and maximum starvation registers 724, 722 are compared by a compare module 728. When the values are equal, the output of the fairness queue 702 is enabled, meaning that the agent associated with the agent ID at the top of the queue 702 is identified for command processing by the DBX. Furthermore, this activates the reset module 726 to reset the current starvation value in the current starvation register 724 to zero, thereby allowing a new count to start for the next agent ID in the queue 702. When the current and maximum starvation values are determined by the compare module 728 to be unequal, this indicates that a disparity still exists between the values in the two registers 722, 724, and it is not yet time to process the agent request associated with the agent ID at the top of the queue 702. In this case, the current starvation value in the current starvation register 724 is incremented via the incrementation module 730. Thus, each time the agent ID at the top of the queue 702 is skipped, the current starvation register is incremented until the current starvation value matches the programmed maximum starvation value. When the PCI interface logic begins serving the agent at the output of the fairness queue 702, that entry is deleted from the queue 702.

In accordance with one embodiment of the invention, a predetermined value in the maximum starvation register 722 may represent a predefined condition. For example, a hexadecimal "F" (i.e., "1111") in the maximum starvation register 722 may entirely disable the imposition of any fairness to allow for maximum throughput. For example, rather than a maximum starvation value of "1111" representing the possibility of sixteen skips, it may instead represent a code that disables the imposition of fairness. For example, one manner of effecting such a "code" is to cause the current starvation value to continually reset on each pass, when the value in the maximum starvation value is set to "1111." This will make it impossible for the current starvation value to reach the maximum starvation value, and the fairness FIFO 702 will in effect be disabled until the maximum starvation value is changed from "1111." In such a case, the arbiter (not shown) will fully control arbitration.

Figure 8:
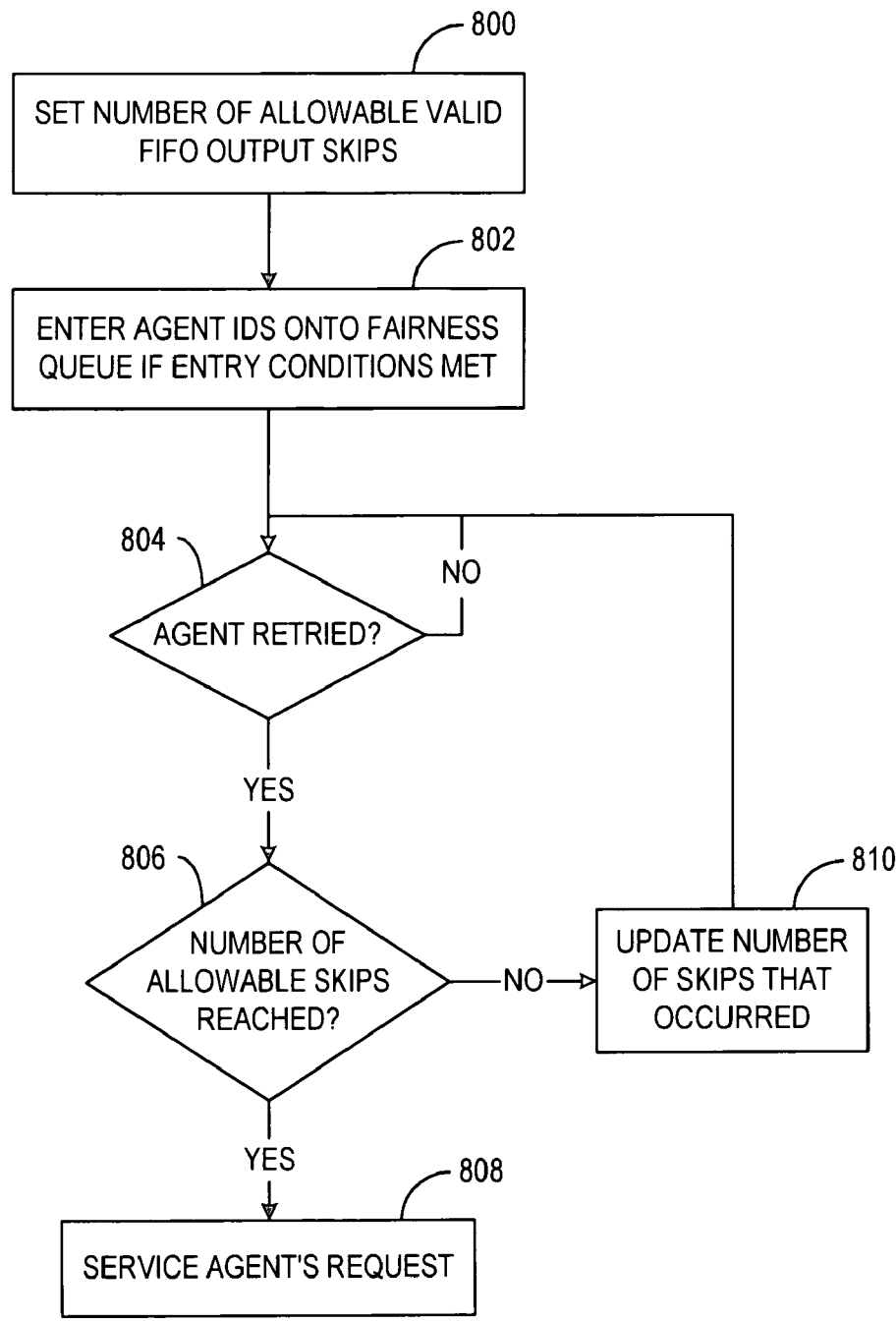
FIG. 8 is a flow diagram illustrating an exemplary manner of adjusting the imposed fairness in accordance with the principles of the present invention.

FIG. 8 is a flow diagram illustrating an exemplary manner of adjusting the imposed fairness in accordance with the principles of the present invention. For purposes of illustration, this example pertains to a particular agent whose corresponding agent ID has reached the top (i.e., first in line) of the fairness FIFO. As described above, a parameter may be set to define the number of times in which the valid output of the fairness FIFO may be passed over or "skipped" before it is serviced by the PCI interface logic. This is shown at block 800, where the number of allowable valid fairness FIFO output skips is set. Agent IDs are entered 802 onto the fairness queue if the entry conditions are met. When the agent has been retried, it is determined 806 whether the number of allowable "skips" of the FIFO output has been reached. If so, the corresponding agent/adapter card is serviced as shown at block 808. Otherwise, the number of skips that have occurred for that agent ID entry is updated 810. This process continues until the set number of allowable skips has been reached, and the agent can be serviced.

Figure 9:
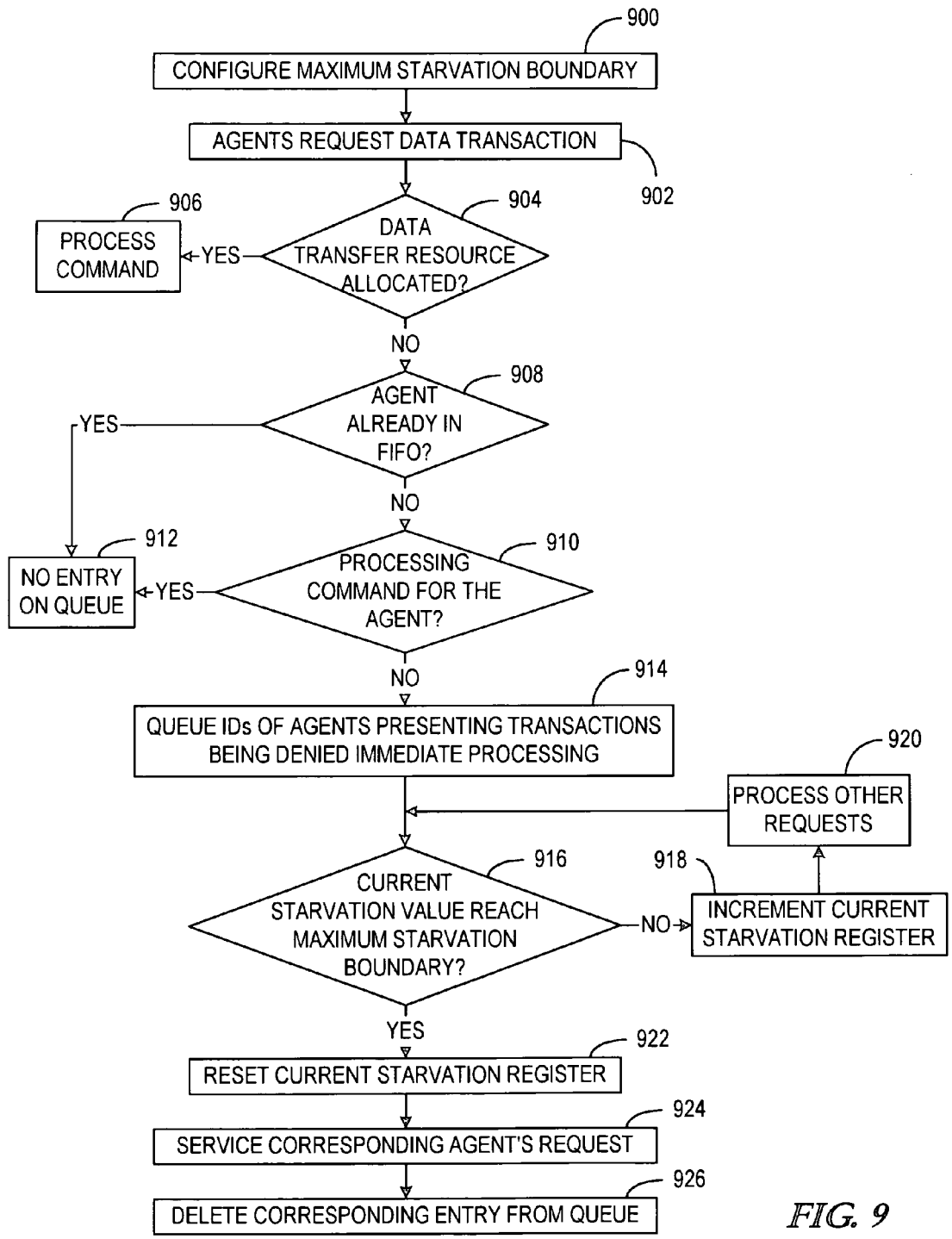
FIG. 9 is a flow diagram illustrating a more particular embodiment of a manner of adjusting the imposed fairness in accordance with the principles of the present invention.

FIG. 9 is a flow diagram illustrating a more particular embodiment of a manner of adjusting the imposed fairness in accordance with the principles of the present invention. In this embodiment, a maximum starvation boundary is configured 900. For example, a maximum starvation value can be loaded into a maximum starvation register upon initialization of the system. At some point, an agent requests 902 a data transaction, such as to read/write data to/from memory. Before an agent ID corresponding to the requesting agent can be entered onto the fairness queue, a number of entry rules may be imposed, such as those shown in decision blocks 904, 908, and 910. For example, if a data transfer resource is available to be allocated to process the agent's command as determined at decision block 904, then there is no need to enter the corresponding agent ID on the queue, and the command is simply processed 906. Otherwise, it is determined 908 whether an agent ID corresponding to the current requesting agent is already in the fairness FIFO. If so, no entry is permitted on the fairness FIFO, as illustrated at block 912. Otherwise, an additional entry rule 910 may be imposed, such as determining whether one or more data transfer resources are already processing a command for that agent. If so, then no entry is permitted on the queue as shown at block 912.

It should be noted that a greater number of entry rules, fewer number of entry rules, or different entry rules than the exemplary entry rules illustrated in FIG. 9 may be used in accordance with the invention. It should also be noted that the particular order in which entry rules are considered need not be as illustrated in FIG. 9. For example, the entry rules may be considered in a different order, and/or performed wholly or partly in parallel.

If no entry rule prohibits entry onto the fairness queue, the agent IDs presenting transactions that are denied immediate processing are queued 914 on the fairness queue. If the current starvation value has not reached the maximum starvation boundary as determined at decision block 916, then the current starvation register value is incremented 918, and other requests/commands are processed 920. If the current starvation value has reached the maximum starvation boundary, then the current starvation register is reset 922, and the corresponding agent's request is serviced 924. When an agent's request has been serviced, its corresponding entry is deleted 926 from the fairness FIFO.

Using the foregoing specification, the invention may be implemented as a process, or article of manufacture by using standard programming and/or engineering techniques to produce programming software, firmware, hardware or any combination thereof.

Any resulting one or more program, having computer-readable program code, may be embodied within one or more computer-usable media such as memory devices or transmitting devices, thereby making a computer program product or article of manufacture in accordance with the invention. Therefore, an article of manufacture and/or computer program product as used herein encompasses a computer program permanently, temporarily, or transitorily existing on any computer-usable medium such as on any storage/memory device or in any transmitting device.

Executing program code directly from one medium, storing program code onto a medium, copying the code from one medium to another, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, a central processing unit (CPU), memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for managing the processing of commands issued on a bus via a plurality of agents, comprising:
   allocating ownership of the bus among the plurality of agents based on a predetermined bus arbitration order;
   queuing agent identifiers of the agents that issued commands which were retried due to unavailable processing resources, wherein an agent having a queued agent identifier is a queued agent; and
   overriding the predetermined bus arbitration order and granting ownership of the bus among the queued agents over other agents seeking ownership of the bus and issuing commands not retried, wherein ownership of the bus is granted among the queued agents in an order in which the queued agent identifiers were queued relative to each other, and the overriding of the predetermined bus arbitration order and the granting of ownership of the bus among the queued agents satisfies a configurable ratio of a number of grants of ownership to the other agents seeking ownership of the bus and issuing commands not retried, to a number of grants of ownership to queued agents.

2. The method of claim 1, further comprising issuing retry responses for commands issued by the other agents to avail the processing resources to the agents corresponding to the queued agent identifiers.

3. The method of claim 1, wherein queuing agent identifiers comprises queuing the agent identifiers in a first-in, first-out fashion.

4. The method of claim 3, wherein granting ownership of the bus among the queued agent identifiers comprises granting ownership of the bus to the agents corresponding to the queued agent identifiers in a first-in, first-out fashion.

5. The method of claim 1, wherein granting ownership of the bus comprises always granting ownership of the bus among the queued agents over the other agents seeking access to the bus.

6. The method of claim 1, wherein granting ownership of the bus comprises granting ownership of the bus to the agents corresponding to the queued agent identifiers over the other agents seeking ownership of the bus in accordance with a predefined fairness algorithm.

7. The method of claim 1, further comprising regulating the ownership of the bus between the agents corresponding to the queued agent identifiers and the other agents seeking ownership of the bus.

8. The method of claim 7, wherein regulating the ownership of the bus comprises selectively granting the ownership of the bus to agents corresponding to the queued agent identifiers over the other agents seeking ownership of the bus.

9. The method of claim 8, wherein selectively granting ownership of the bus comprises disregarding the granting of the ownership of the bus to the agents corresponding to the queued agent identifiers over the other agents seeking ownership of the bus in accordance with a configurable pattern.

10. The method of claim 1, further comprising imposing queue entry rules on the agent identifiers of the agents that issued commands which were retried, and wherein queuing the agent identifiers comprises queuing only those agent identifiers complying with the queue entry rules.

11. The method of claim 10, wherein imposing queue entry rules comprises prohibiting queuing the agent identifiers associated with commands that were retried if the agent identifier has already been queued.

12. The method of claim 10, wherein imposing queue entry rules comprises prohibiting queuing the agent identifiers associated with commands that were retried if the processing resources are currently processing a command for the corresponding agent.

13. A method for managing the processing of commands issued on a bus via a plurality of agents, comprising:
   allocating bus ownership among the plurality of agents based on a predetermined bus arbitration cycle;
   determining whether processing resources are available to process the commands issued by the agents that have been granted bus ownership;
   initiating a retry for the commands that were not processed due to unavailable processing resources;
   queuing agent identifiers corresponding to each of the agents in which a retry was initiated;
   receiving one or more controllable configuration parameters indicative of a desired processing ratio in which the commands issued according to the predetermined bus arbitration cycle are to be processed relative to the commands associated with the queued agent identifiers; and overriding the predetermined bus arbitration cycle and processing the commands associated with the agent identifiers that have been queued according to the desired processing ratio indicated by the controllable configuration parameters.

14. The method of claim 13, wherein the one or more controllable configuration parameters comprise a count representing a number of times in which the processing of the queued agent identifiers will be not be allowed to override the predetermined bus arbitration cycle.

15. The method of claim 13, wherein overriding the predetermined bus arbitration cycle comprises allowing processing of the commands associated with the queued agent identifiers vis-á-vis the commands issued on the bus in accordance with the predetermined bus arbitration cycle.

16. The method of claim 13, wherein initiating a retry for the commands that were not processed comprises issuing a retry response in response to determining that the processing resources are unavailable.

17. The method of claim 13, further comprising imposing queue entry rules on the agent identifiers corresponding to the agents in which a retry was initiated, and wherein queuing the agent identifiers comprises queuing only those agent identifiers complying with the queue entry rules.

18. The method of claim 13, wherein the processing resources comprise at least one read thread.

19. The method of claim 13, wherein the processing resources comprise at least one write thread.

20. A method for managing the processing of commands issued on a bus via a plurality of agents, comprising:

allocating ownership of the bus among the plurality of agents based on a predetermined bus arbitration order;

queuing agent identifiers identifying the agents that issued commands which were retried due to unavailable processing resources, wherein an agent having a queued agent identifier is a queued agent;

overriding the predetermined bus arbitration order and granting ownership of the bus among the queued agents over other agents seeking ownership of the bus and issuing commands not retried, wherein ownership of the bus is granted among the queued agents in an order in which the queued agent identifiers were queued; and dynamically controlling a ratio of a number grants of ownership to the other agents seeking ownership of the bus and issuing commands not retried, to a number of grants of ownership to queued agents.

21. The method of claim 20, wherein dynamically controlling the ratio comprises receiving one or more controllable configuration parameters, and regulating the frequency at which the queued agent identifiers are granted bus ownership in response to the controllable configuration parameters.

22. The method of claim 21, wherein controlling the ratio comprises enabling the queued agent identifiers to be output from a queue for processing after a predetermined number of valid queued agent identifiers have been passed over for processing.

23. The method of claim 22, wherein enabling the queued agent identifiers to be output from a queue for processing comprises:

comparing a predetermined pass over count to a current pass over count;

incrementing the current pass over count each time a valid queued agent identifier has been passed over for processing; and enabling the queued agent identifiers to be output from the queue when the current pass over count reaches the predetermined pass over count.

24. A cooperative arbitration and processing resource allocation system, comprising:

(a) an established-order arbiter for allocating bus ownership among a plurality of bus agents according to a predetermined bus arbitration order;

(b) a processing fairness module, comprising:
  (i) a queue to store bus agent identifiers (IDs) corresponding to bus agents that issued commands which were subjected to a retry due to unavailable processing resources, wherein an agent having a queued agent identifier is a queued agent;
  (ii) a dynamically configurable queue output throttle to adjust an availability of a valid bus agent ID at an output of the queue;

(c) an override module coupled to the established-order arbiter and the processing fairness module to override the predetermined bus arbitration order and grant ownership of the bus among the queued agents over other bus agents seeking bus ownership and issuing commands not retried, depending on a configurable ratio of a number grants of ownership to the other agents seeking ownership of the bus and issuing commands not retried, to a number of grants of ownership to queued agents as controlled by the queue output throttle.

25. The cooperative arbitration and processing resource allocation system as in claim 24, wherein the dynamically configurable queue output throttle comprises:

a maximum starvation register to store a predetermined number of valid bus agent IDs that will be passed over for processing;

a current starvation register to store a current number of valid bus agent IDs that have been passed over for processing; and a compare module coupled to the maximum starvation register and the current starvation register to compare the current and predetermined numbers of valid bus agent IDs that have been passed over for processing, and to output an availability indicator to indicate the availability of the valid bus agent ID.

26. The cooperative arbitration and processing resource allocation system as in claim 25, further comprising an incrementing module coupled to the current starvation register to increment the current starvation register each time that the valid bus agent ID has been passed over for processing.

27. The cooperative arbitration and processing resource allocation system as in claim 26, further comprising a reset module coupled to the current starvation register to reset the current starvation register upon the output of the availability indicator.

28. The cooperative arbitration and processing resource allocation system as in claim 25, wherein the maximum starvation register comprises an input to receive the predetermined number of valid bus agent IDs that will be passed over for processing.

29. The cooperative arbitration and processing resource allocation system as in claim 24, further comprising a fairness entry validation module to prohibit entry of the bus agent IDs onto the queue that do not comply with one or more predetermined queue entry rules.

30. A system for allocating command processing resources, comprising:
- (a) a plurality of bus agents each capable of issuing commands;
- (b) an input/output (I/O) bus coupled to each of the bus agents to facilitate transfer of the commands;
- (c) a memory bus to facilitate transfer of the commands to and from a memory; and
- (d) an I/O bridge module to interface the I/O bus and the memory bus, wherein the I/O bridge module comprises:
  - (1) an established-order arbiter for allocating bus ownership among a plurality of bus agents according to a predetermined bus arbitration order;
  - (2) a processing fairness module, comprising:
    - (i) a queue to store bus agent identifiers (IDs) corresponding to bus agents that issued commands which were subjected to a retry due to unavailable processing resources, wherein an agent having a queued agent identifier is a queued agent;
    - (ii) a dynamically configurable queue output throttle to adjust an availability of a valid bus agent ID at an output of the queue; and
  - (3) an override module coupled to the established-order arbiter and the processing fairness module to override the predetermined bus arbitration order and grant ownership of the bus among the queued agents over other agents seeking bus ownership and issuing commands not retried, depending on a configurable ratio of a number grants of ownership to the other agents seeking ownership of the bus and issuing commands not retried, to a number of grants of ownership to queued agents as controlled by the queue output throttle.

31. The system as in claim 30, further comprising a plurality of the I/O buses, each coupled to a different plurality of the bus agents, and wherein the I/O bridge module comprises an established-order arbiter, a processing fairness module, and an override module for each of the plurality of the I/O buses.

32. A cooperative arbitration and processing resource allocation system for managing the processing of commands issued on a bus via a plurality of agents, comprising:
- means for allocating ownership of the bus among the plurality of agents based on a predetermined bus arbitration order;
- means for queuing agent identifiers of the agents that issued commands which were retried due to unavailable processing resources, wherein an agent having a queued agent identifier is a queued agent;
- means for overriding the predetermined bus arbitration order and for granting ownership of the bus among the queued agents over other agents seeking ownership of the bus and issuing commands not retried, wherein ownership of the bus is granted among the queued agents in an order in which the queued agent identifiers were queued; and
- means for controlling a ratio of a number grants of ownership to the other agents seeking ownership of the bus and issuing commands not retried, to a number of grants of ownership to queued agents.

* * * * *